Sept. 14, 1954  W. FLUCKIGER ET AL  2,688,799
ARRANGEMENT FOR SECURING A DENTAL
PROSTHESIS IN THE WEARER'S MOUTH
Filed Jan. 14, 1953
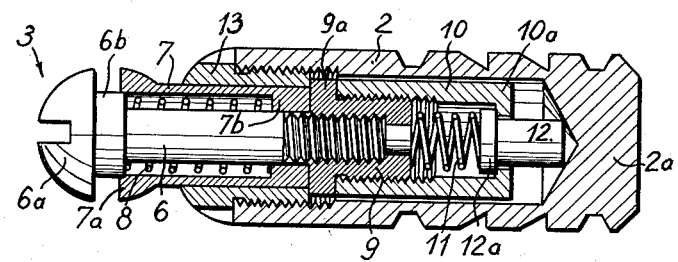
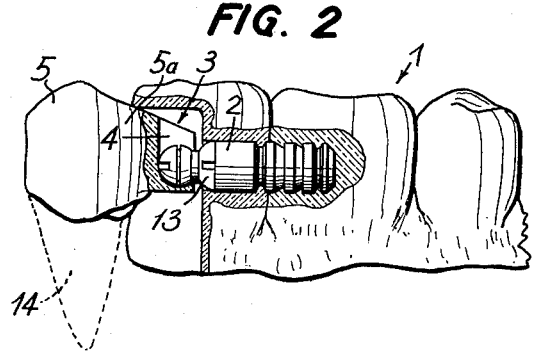
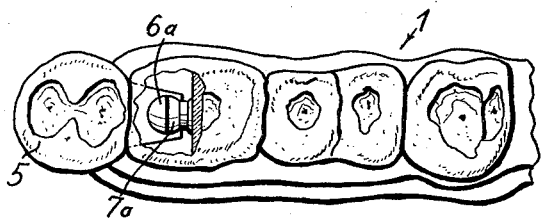
INVENTORS:
WILLY FLUCKIGER AND
JULIEN HUGUENIN
BY:

Patented Sept. 14, 1954

2,688,799

UNITED STATES PATENT OFFICE 2,688,799

ARRANGEMENT FOR SECURING A DENTAL PROSTHESIS IN THE WEARER'S MOUTH

Willy Fluckiger and Julien Huguenin,
La Chaux de Fonds, Switzerland

Application January 14, 1953, Serial No. 331,286

Claims priority, application Switzerland
October 7, 1952

7 Claims. (Cl. 32—5)

Our invention has for its object an arrangement for securing a dental prosthesis in the wearer's mouth, said arrangement being of the type including two interchangeable male and female parts, one of said parts belonging to the prosthesis while the other is permanently secured in the wearer's mouth.

According to a primary object of our invention, the male part includes a rotula constituted by two hemispheres that are movable with reference to each other while a spring urges them apart so that said rotula is urged with some friction inside the recess in the female part which is to house said male part, said rotula being carried by an outer securing socket with reference to which it may be shifted against the action of a return spring.

We have illustrated by way of example in accompanying drawings a preferred embodiment of our invention; in said drawings:

Fig. 1 is an axial cross-section of the arrangement;

Fig. 2 is an elevational view partly sectional of a part of a dental prosthesis, and Fig. 3 is a plan view of the arrangement.

The prosthesis that is partly shown in Figs. 2 and 3 is designated by the reference number 1. In the body of the prosthesis is embedded an outer securing socket 2 belonging to the arrangement holding the prosthesis in position. This outer socket serves for connecting with said prosthesis a rotula 3 adapted to engage a recess 4 in the female extension 5a of an anchoring member 5 constituted by a crown mounted on a natural tooth 14 and consequently fitted in a permanent manner inside the mouth. The rotula 3 includes two parts of which one is constituted by the hemispherical head 6a of a rod 6 while the other is constituted by a likewise hemispherical shoulder 7a rigid with a sleeve 7 slidingly mounted over the rod. A coil spring 8 surrounds the rod 6 inside the outer sleeve 7 and its ends engage respectively a shoulder 6b on said rod 6 and the bottom 7b of the sleeve 7, whereby the part 7a of the rotula is urged away from the cooperating part 6a while the bottom 7b of the sleeve 7 is urged against a flange 9a formed on a nut-shaped member screwed over the rod 6. This outwardly threaded nut-shaped member 9 is screwed in its turn inside a socket 10 slidingly mounted inside the outer socket 2. A coil spring 11 is housed inside the socket 10 and its ends engage respectively the corresponding end of the nut-shaped member 9 and the head 12a of a shud 12 passing through the perforated bottom 10a of the socket 10. The open end of the outer socket 2 is screwed over a ring 13 slidingly mounted over the sleeve 7. The stud 12 which bears against the bottom 2a of the socket 2 urges the rod 6 and the nut 9 towards the left hand side of Fig. 1 under the action of the spring 11 until the flange 9a on the nut 9, which flange projects beyond the periphery of the sleeve 7, engages the ring 13 rigid with the outer socket 2.

In this arrangement, the rotula that includes two parts which have a tendency to move apart, is urged with some friction inside the recess 4 in the anchoring member 5 in front of which it lies. Furthermore, the system of parts associated with the rotula may recede slightly against the action of the spring 11, which allows the prosthesis to be submitted to very slight deformations without this exerting a detrimental action on the natural tooth carrying the anchoring crown 5 which is thus permanently secured inside the mouth.

What we claim is:

1. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including two hemispherical sections forming together a rotula and adapted to move with reference to each other and a spring urging said rotula sections apart to make one of them engage with friction the female part, an outer securing socket inside which the rotula is adapted to slide, a return spring urging said male part towards the female part, said outer securing socket being rigidly mounted on the other of the two first mentioned parts: the prosthesis and the anchoring member.

2. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including two hemispherical sections forming together a rotula and adapted to move with reference to each other and a spring urging said rotula sections apart to make one of them engage with friction the female part, an outer securing socket inside which the rotula is adapted to slide, stops defining the ends of the path of the male part, a return spring urging said male part towards the female part, said outer socket being rigidly mounted on the other of the two first mentioned parts: the prosthesis and the anchoring member.

3. An arrangement for securing a dental prosthesis by means of a female anchoring part permanently fixed inside the wearer's mouth, said arrangement comprising a male part including two hemispherical sections forming together a rotula and adapted to move with reference to each other and a spring urging said rotula sections apart to make one of them engage with friction the female part, an outer securing socket inside which the rotula is adapted to slide, a return spring urging said male part towards the female part, said outer securing socket being embedded in the prosthesis.

4. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including a hemispherical head adapted to engage the female part, a rod axially rigid with said hemispherical head, an annular hemispherical head fitted over said rod and adapted to form a complete rotula with the first mentioned head, a sliding sleeve rigid with said annular head and fitted coaxially over the rod and a spring urging the rod and the sleeve and thereby the two heads apart, an outer securing socket in which said sleeve is slidably secured and a return spring urging said male part towards the female part, said outer securing socket being rigidly mounted on the other of the two first mentioned parts: the prosthesis and the anchoring member.

5. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including a hemispherical head adapted to engage the female part, a rod axially rigid with said hemispherical head, an annular hemispherical head fitted over said rod and adapted to form a complete rotula with the first mentioned head, a sliding sleeve rigid with said annular head and fitted coaxially over the rod, an outer flange at the end of the rod nearest the first mentioned head, an inner flange on the sleeve engaging the opposite end of the rod and a coil spring surrounding said rod and fitted between said collar and said flange, to urge the rod and the sleeve and thereby the two heads apart, an outer securing socket in which said sleeve is slidably secured and a return spring urging said male part towards the female part, said outer securing socket being rigidly mounted on the other of the two first mentioned parts: the prosthesis and the anchoring member.

6. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including a hemispherical head adapted to engage the female part, a rod axially rigid with said hemispherical head, an annular hemispherical head fitted over said rod and adapted to form a complete rotula with the first mentioned head, a sliding sleeve rigid with said annular head and fitted coaxially over the rod and a spring urging the rod and the sleeve and thereby the two heads apart, an outwardly threaded nut threadedly engaging the rod, a socket having a perforated bottom and a tapped open end engaging the outer thread of said nut, a spring mounted inside said socket and engaging the nut, a stud passing through the perforated bottom of said socket and including an enlarged head lying inside the socket and forming an abutment for last mentioned spring, an outer socket adapted to be secured to the other of the first mentioned parts: the prosthesis and the anchoring member, and inside which the first socket is slidingly fitted, the outer end of the stud engaging the closed end of the said outer socket.

7. An arrangement for securing a dental prosthesis to an anchoring member permanently fixed inside the wearer's mouth, said arrangement comprising a female part adapted to be rigidly secured to one of the following parts: the anchoring member and the prosthesis, and a male part including a hemispherical head adapted to engage the female part, a rod axially rigid with said hemispherical head, an annular hemispherical head fitted over said rod and adapted to form a complete rotula with the first mentioned head, a sliding sleeve rigid with said annular head and fitted coaxially over the rod and a spring urging the rod and the sleeve and thereby the two heads apart, an outwardly threaded nut threadedly engaging the rod and including an outer flange facing the sleeve of the male part and the diameter of which is larger than that of the sleeve of the male part, a socket having a perforated bottom and a tapped open end engaging the outer thread of said nut, a spring mounted inside said socket and engaging the nut, a stud passing through the perforated bottom of said socket and including an enlarged head lying inside the socket and forming an abutment for last mentioned spring, an outer socket adapted to be secured to the other of the first mentioned parts: the prosthesis and the anchoring member, and inside which the first socket is slidingly fitted, the outer end of the stud engaging the closed end of the said outer socket, and an outwardly threaded ring slidingly fitted over the sleeve rigid with the second rotula head and threadedly engaging the outer socket, the inner end of said ring forming an abutment engaging the surface of the nut flange facing the sleeve forming part of the male part.

References Cited in the file of this patent

UNITED STATES PATENTS

| Number | Name | Date |
|---|---|---|
| 2,593,287 | Fiorentini | Apr. 15, 1952 |